United States Patent [19]
Griffin

[11] 4,125,495
[45] * Nov. 14, 1978

[54] SYNTHETIC/RESIN BASED COMPOSITIONS

[75] Inventor: Gerald J. L. Griffin, London, England

[73] Assignee: Coloroll Limited, London, England

[*] Notice: The portion of the term of this patent subsequent to May 3, 1994, has been disclaimed.

[21] Appl. No.: 775,036

[22] Filed: Mar. 7, 1977

Related U.S. Application Data

[60] Continuation-in-part of Ser. No. 527,038, Nov. 25, 1974, Pat. No. 4,016,117, and Ser. No. 665,418, Mar. 10, 1976, Pat. No. 4,021,388, which is a division of Ser. No. 527,038, , which is a continuation-in-part of Ser. No. 353,414, Apr. 23, 1973, abandoned.

[30] Foreign Application Priority Data

Feb. 18, 1977 [GB] United Kingdom ............... 06987/77

[51] Int. Cl.² .......................... C08L 1/00; C08L 3/00; C08L 5/00
[52] U.S. Cl. ...................... 260/17.4 ST; 260/174 SG; 260/18 TN; 260/23 XA; 260/23 S; 260/23 H; 260/DIG. 43; 526/1; 526/5
[58] Field of Search .................. 260/17.4 ST, 18 TN, 260/23 XA, 23 S, 23 H, 17.4 SG, DIG. 43; 526/1, 5

[56] References Cited

U.S. PATENT DOCUMENTS

| | | | |
|---|---|---|---|
| 3,329,509 | 7/1967 | Julius | 260/17.4 ST |
| 3,488,724 | 1/1970 | Donermeyer et al. | 260/17.4 ST |
| 3,634,562 | 1/1972 | Kole et al. | 260/2.5 B |
| 3,767,604 | 10/1973 | Hjermstad et al. | 260/17.4 ST |
| 3,949,145 | 4/1976 | Otey et al. | 260/DIG. 43 |
| 3,952,347 | 4/1976 | Comerford et al. | 260/17.4 ST |
| 4,021,388 | 5/1977 | Griffin | 260/17.4 ST |
| 4,026,849 | 5/1977 | Bagley et al. | 260/17.4 ST |

FOREIGN PATENT DOCUMENTS 7,527,854 3/1975 Japan.

*Primary Examiner*—Melvyn I. Marquis
*Attorney, Agent, or Firm*—Stevens, Davis, Miller & Mosher

[57] ABSTRACT

A biodegradable composition contains a high proportion, i.e., over 50% of biodegradable starch. The composition is particularly useful for making trays for holding meat. These trays are liquid repellant but gas permeable.

5 Claims, 1 Drawing Figure

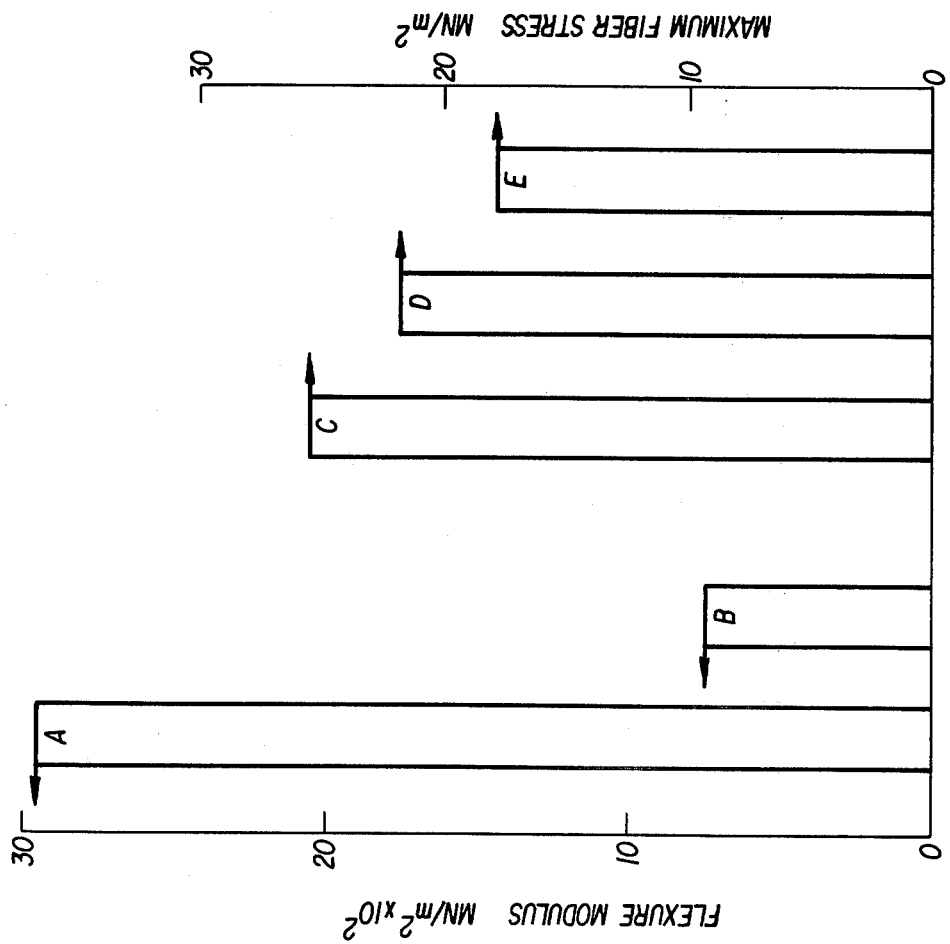

SYNTHETIC/RESIN BASED COMPOSITIONS

This application is a continuation-in-part of my earlier filed copending applications Ser. No. 527,038 filed Nov. 25, 1974, now U.S. Pat. No. 4,016,117 granted Apr. 5, 1977 and Ser. No. 665,418 filed Mar. 10, 1976, now U.S. Pat. No. 4,021,388 granted May 3, 1977 a divisional application of Ser. No. 527,038, said application Ser. No. 527,038 now U.S. Pat. No. 4,016,117 being a continuation-in-part application of my application Ser. No. 353,414 filed Apr. 23, 1973 and now abandoned.

According to claim 1 of the Specification of Patent Application No. 665,418 now U.S. Pat. No. 4,021,388 there is provided a biodegradable composition comprising a polymer having carbon linkages and natural starch granules, the surfaces of said granules being modified by reaction with a compound which readily reacts with hydroxyl groups to form an ether or an ester.

The Specification is primarily concerned with compositions wherein the maximum biodegradable substance (starch) content is 50% by weight.

In accordance with the present invention compositions are provided wherein the starch content exceeds 50% by weight. Preferably the composition will include an autoxidisable substance preferably in a concentration of up to 5.5% by weight as set out in the Specification of Patent Application No. 527,038 now U.S. Pat. No. 4,016,117. In accordance with the disclosure in this earlier application, a biodegradable synthetic polymeric composition having carbon to carbon linkages also contains up to 5.5% by weight of an auto-oxidizable substance containing at least one double bond which when in contact with a transition metal salt auto-oxidizes to generate a peroxide or a hydroperoxide. The auto-oxidizable substance may be selected from the group consisting of a fatty acid, a fatty acid ester, a natural fat and mixtures thereof.

The following examples illustrate the present invention:

When working with compositions containing over 50% of starch we find the preferred method of fabrication is that of calendering, although compression moulding is equally effective, even if rather slow.

EXAMPLE I

MANUFACTURE OF CALENDERED PLASTICISED PVC POLYVINYL CHLORIDE SHEET

Normal "pearl" corn starch containing 13% water was blended in a stirred open vessel with 0.5% of hydrogen polydimethyl siloxane as manufactured by the Dow Chemical Corporation under the code number DC 1107. The temperature of the starch was raised progressively by a heated jacket to 150° C over a period of about 6 hours, and maintained at this temperature for a further period of about 6 hours. The resulting starch was a fine powder containing less than 0.5% of moisture and displayed hydrophobic properties to the extent that it would float on the surface of distilled water, even after brisk agitation. This starch was used in the following recipe:

| | |
|---|---|
| Polyvinyl chloride powder, ICI Corvic, H65 | 1000 parts by weight |
| Search | 1600 parts by weight |
| Dioctyl phthalate plasticiser | 430 parts by weight |
| Tritotyl phosphate plasticiser | 70 parts by weight |
| Lead stearate stabiliser | 10 parts by weight |
| (Starch content 51% by weight) | |

The ingredients were pre-blended in a spiral blade trough mixer at room temperature, followed by fluxing on a laboratory 2-roll even-speed mill heated by steam at 90 psig. The material was transferred hot to a laboratory 3-bowl calender with 300 mm wide bowls from which the product emerged as a strong supple translucent film, 100 micrometers thick.

The intended application of such material is as mulch film and sample strips exposed on the surface of moist soil in trays in an unheated greenhouse in the south of England showed a progressive change in appearance, in the form of shrinkage and embrittlement, with the development of surface mycelial growth after about 2 months.

A further example has involved extending these formulations beyond the critical level occurring at about 60% weight loading with starch, at which the composition becomes porous because the quantity of polymer present is no longer sufficient to fill all the interstices between the starch grains.

EXAMPLE II

| | |
|---|---|
| ABS (acrylonitrile/butadiene/styrene) co-polymer "polystyrene" resin sold by Monsanto Company under the Trade Mark "Lustran" | 100 parts by weight |
| Starch rendered hydrophobic as in Example 1 | 175 parts by weight |
| Ethyl oleate (autoxidisable substance) | 0.6 parts by weight |
| Oleic acid | 0.05 parts by weight |
| Titanium dioxide pigment | 3.0 parts by weight |
| (63% starch by weight) | |

The ingredients were pre-blended in a spiral blade trough mixer when fluxed on a 2-roll mill, heated by steam at 90 psig and finally stripped from the mill as a smooth hide about 3 mm thick. This hide was subsequently thermoformed, after re-heating to 150° C, to make shallow dishes which were very strong and had a matt white appearance and a water repellant surface. The intended application is as meat trays, because the porosity of the composition allows the easy access of atmospheric oxygen through the body of the dish to the contacting surface of fresh meat placed in the dish, thus delaying the development of the discolouration familiar in the case of fresh meat packed on impermeable polystyrene dishes. Furthermore, the hydrophobic nature of the composition inhibits the absorption of blood from the meat into the body of the dish which would otherwise cause unsightly staining.

A further intended application of such high starch-containing compositions is in the thermoforming or compression moulding of planting containers, because these porous, high starch content systems based on brittle resins disintegrate fairly rapidly in moist non-sterile soil as the biological swelling and liquefaction of the starch disrupts the thin membranes of polymer existing between the starch grains.

EXAMPLE III

A suspension of maize starch was prepared in deionised water such that 1200 gr. of starch was contained in every 4 liters of water, and the suspension was stirred whilst 43.2 gr. of a sodium siliconate preparation, Dow Corning 772, previously diluted to 100 gr. with de-ionised water was added, after which the pH of the system was adjusted to pH8 by the slow addition of dilute acetic acid. The suspension was then blended with a sufficient quantity of polyvinylidene chloride-/acetate co-polymer emulsion as to produce a concentration of resin of 10% calculated on the dry weight of the starch. The suspension was then admitted to the spray system of a small spray drying unit with the atomising air pressure at 4 Kg/cm$^2$ and an electrical power input to the air stream of 3Kw, which produced an inlet air temperature of 170° C and an outlet temperature between 70° – 80° C. Under these conditions, a dry powder containing approximately 90% by weight of starch, could be compression-moulded at about 10 MN/m$^2$ and 150° C to give quite strong hard white porous products. The intended applications are the same as in Example II.

EXAMPLE IV

A further example of a polystyrene/starch formulation containing 50% ww of starch was prepared by 2 roll mixing and compression moulded at 150° C and approximately 5 MN/m$^2$ to give hard white sheets from which test pieces were cut and tested for degradability by exposure to pure enzyme solutions with resulting changes in physical properties as detailed in the accompanying single sheet of drawings.

I claim:

1. A biodegradable composition including a polymer having carbon to carbon linkages and dispersed therein from more than 50% and up to 90% by weight of starch granules, the surface of said granules being modified by reaction with a compound which reacts with hydroxyl groups to form an ether or an ester.

2. The composition of claim 1 containing up to 5.5% by weight of an auto-oxidizable substance containing at least one double bond which when in contact with a transition metal salt auto-oxidizes to generate a peroxide or a hydroperoxides, said substance being selected from the group consisting of a fatty acid, a fatty acid ester, a natural fat, and mixtures thereof.

3. A composition as claimed in either claim 1 wherein the said compound is a silicone.

4. A composition as claimed in either claim 1 wherein the said compound is an organic isocyanate.

5. A composition as claimed in claim 1 which is gas-permeable and water repellent comprising a polystyrene resin and at least 60% by weight of surface modified starch.